Sept. 18, 1962 R. T. SILVIS 3,054,525
COMBINED BULK MILK AND WHEY TANK
Filed April 4, 1960 4 Sheets-Sheet 1
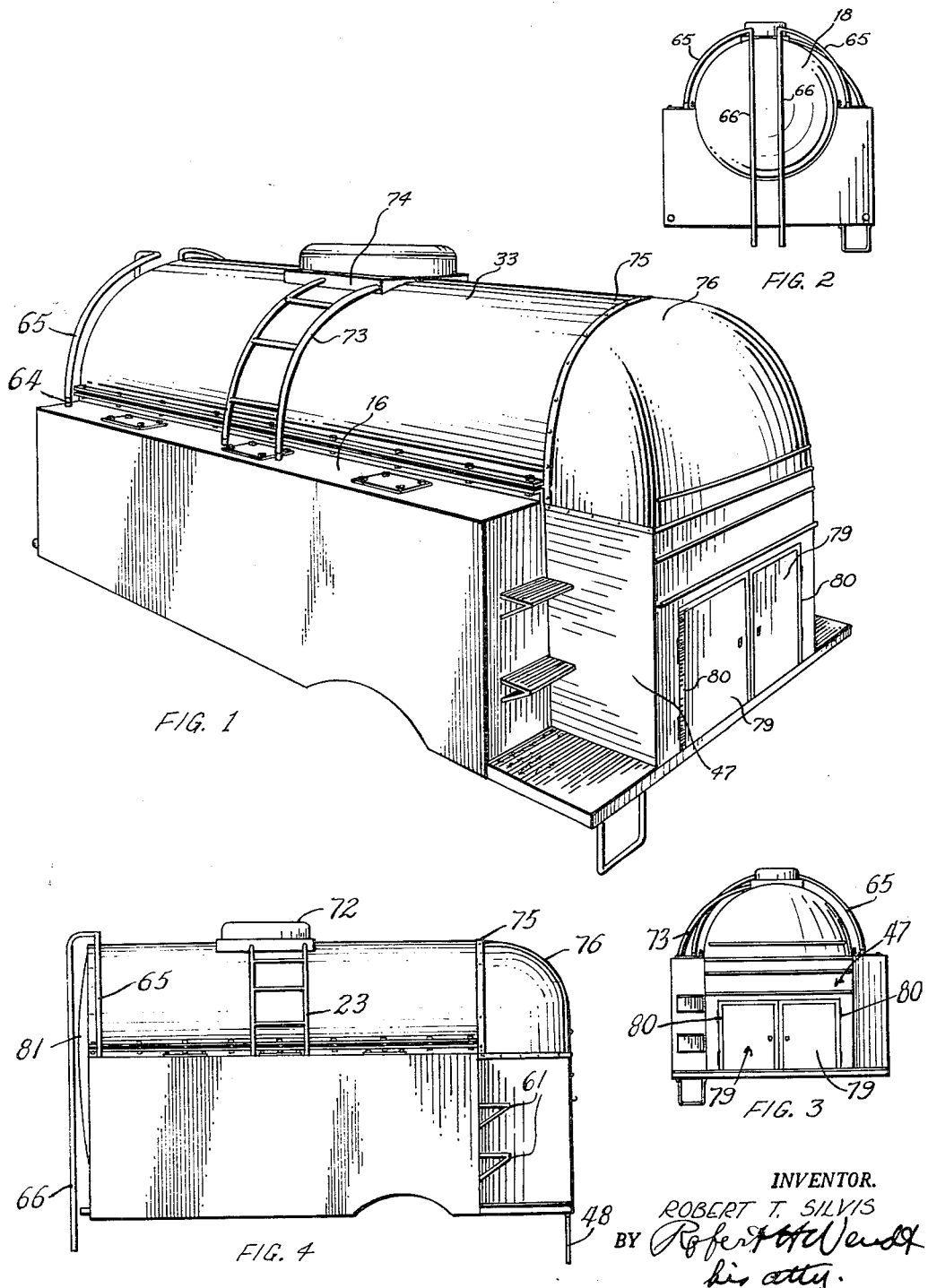
INVENTOR.
ROBERT T. SILVIS

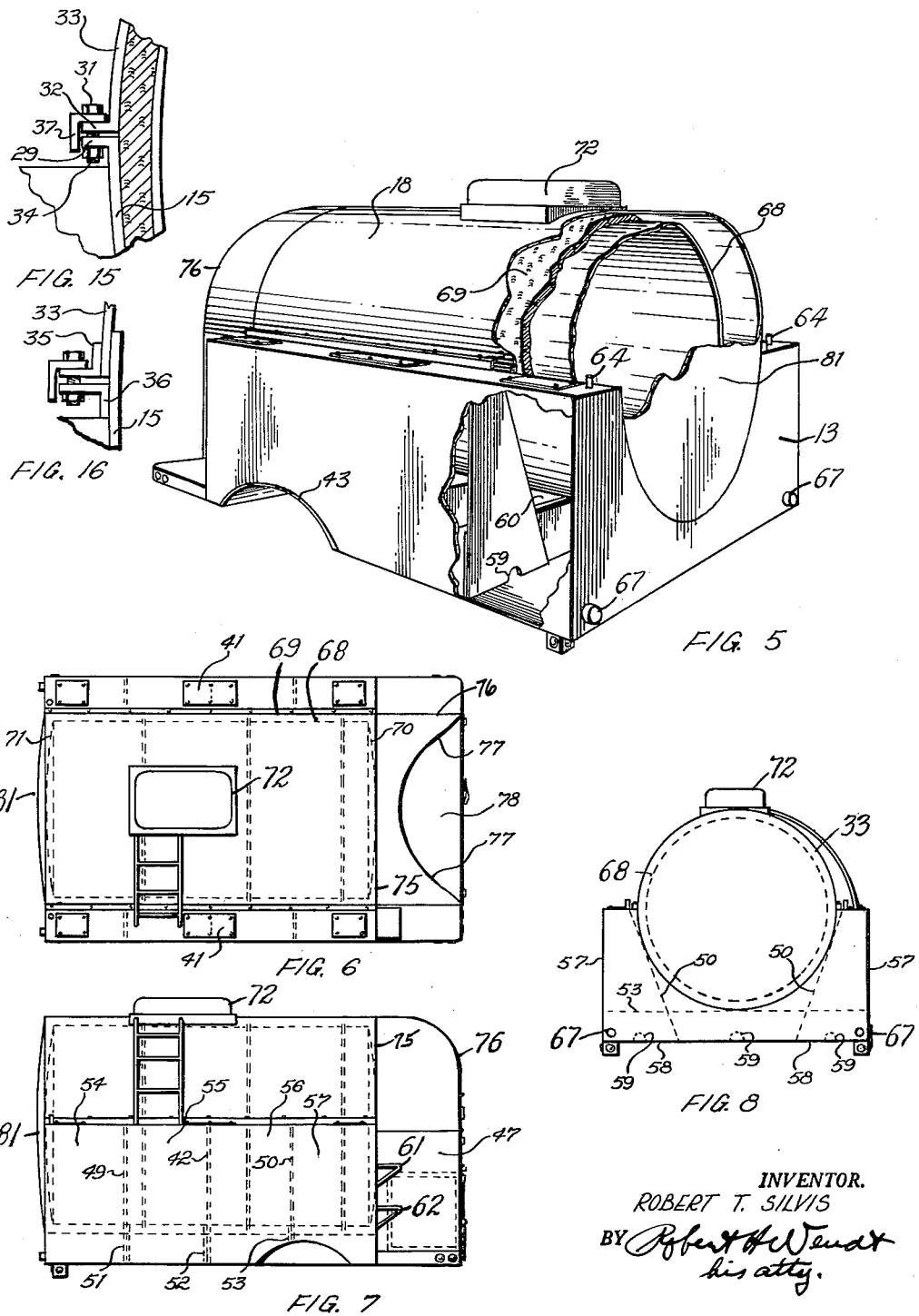

Sept. 18, 1962 R. T. SILVIS 3,054,525
COMBINED BULK MILK AND WHEY TANK
Filed April 4, 1960 4 Sheets-Sheet 3
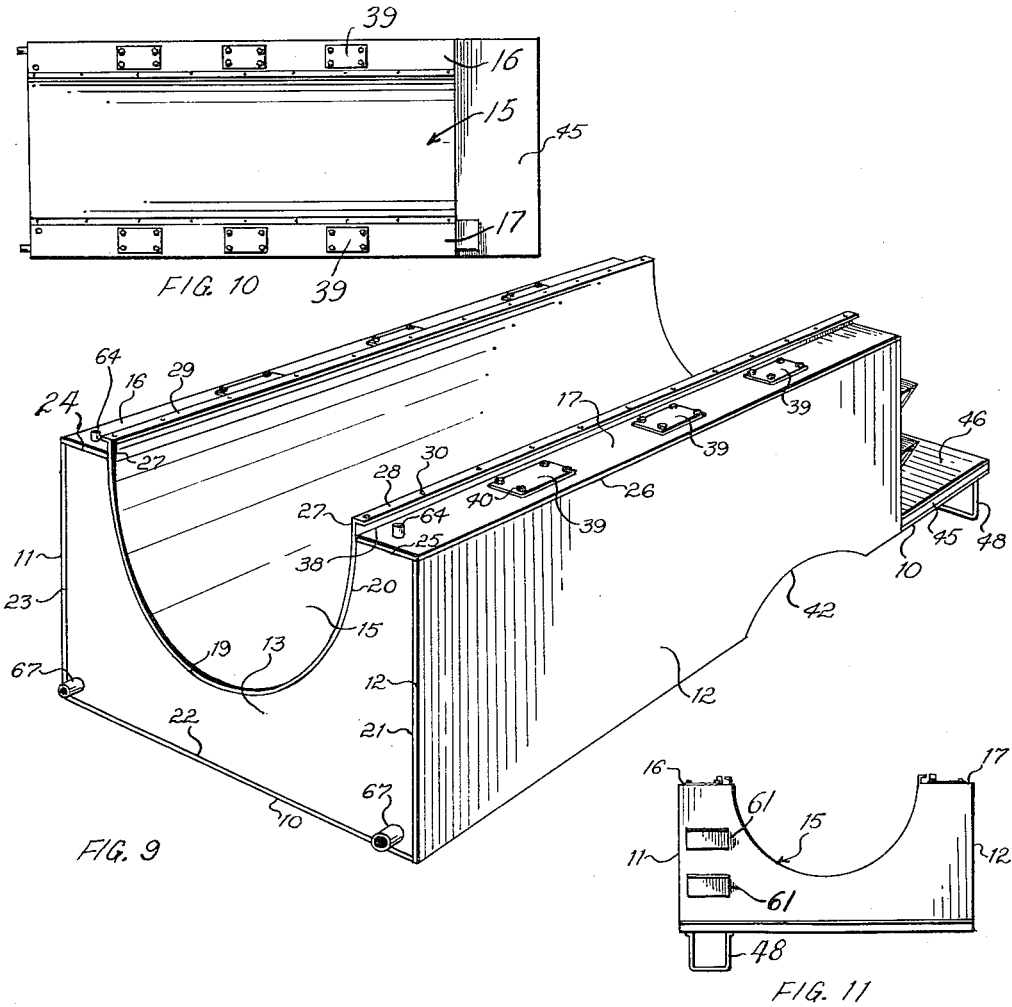
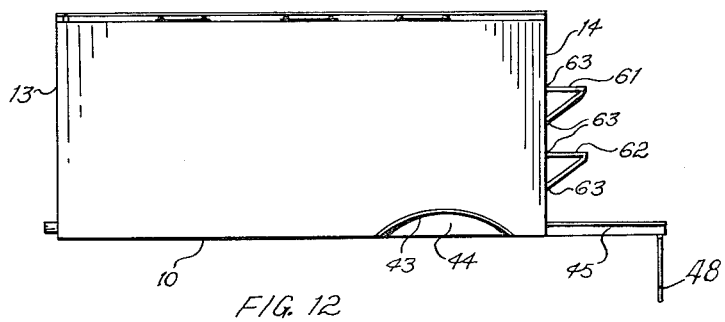
INVENTOR.
ROBERT T. SILVIS
BY Robert H. Ward
his atty.

Sept. 18, 1962 R. T. SILVIS 3,054,525
COMBINED BULK MILK AND WHEY TANK
Filed April 4, 1960 4 Sheets-Sheet 4
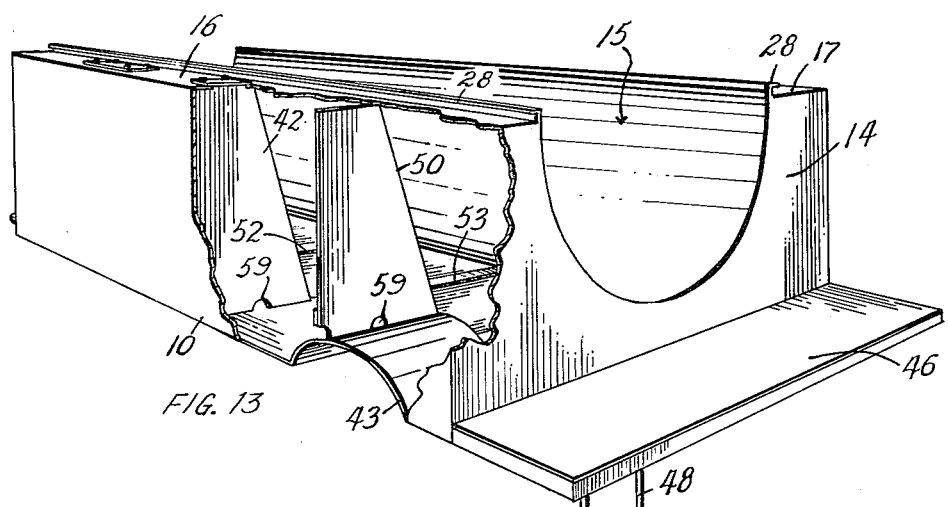
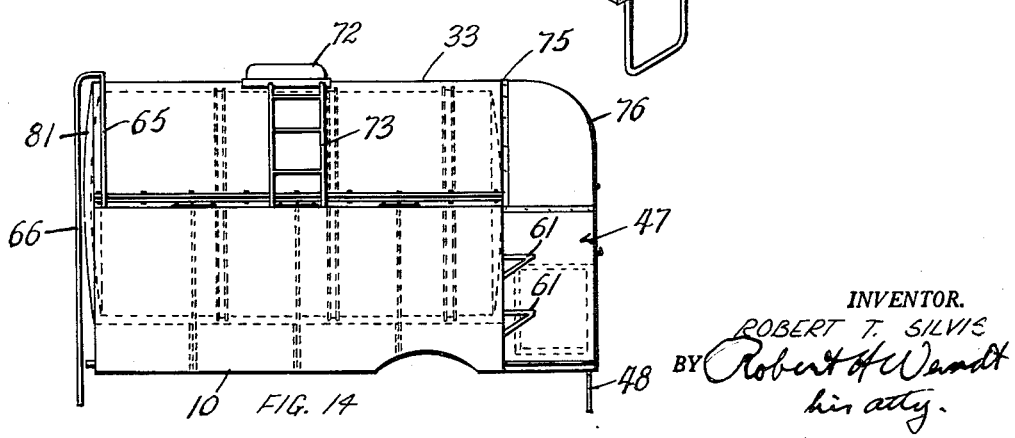
INVENTOR.
ROBERT T. SILVIS
BY Robert H Wendt
his atty.

United States Patent Office 3,054,525
Patented Sept. 18, 1962

3,054,525
COMBINED BULK MILK AND WHEY TANK
Robert T. Silvis, 335 Springfield Ave., South Beloit, Ill.
Filed Apr. 4, 1960, Ser. No. 19,551
4 Claims. (Cl. 220—16)

The present invention relates to combined bulk milk and whey tanks, and is particularly concerned with tanks adapted to be mounted upon the chassis of a truck.

One of the objects of the invention is the provision of an improved tank of the truck type which is adapted to be used for hauling milk and keeping the milk cool and also for hauling whey and dispensing whey to the farmers from whom the milk is purchased.

Liquid whey resulting from the manufacture of cheese is a waste by-product which is often stored in cisterns and other tanks at the cheese factory, where it soon becomes putrid; and it is highly desirable for the cheese factory to be able to dispose of its whey promptly and currently.

Such liquid whey is valuable as feed for pigs and other animals and can be secured at the cheese factories for nothing, so that it can also be dispensed to the farmers free of charge if it can be cheaply transported to the users; and this can be accomplished by the use of the present milk and whey tanks, which may be used to dispense the whey and gather the milk and haul it to market.

One of the objects of the invention is the provision of an improved structure for combined bulk milk and whey tanks by means of which the load is uniformly distributed from front to back between the axles and the distribution is constant, no matter which tank is full or empty.

Another object of the invention is the provision of an improved structure for whey tanks, forming a cradle for supporting the milk tank over the full bottom area of the milk tank, and for distributing and cushioning the load in a complementary saddle provided by the whey tank for the milk tank.

Another object of the invention is the provision of an improved structure for milk and whey tanks by means of which the milk tank may be suitably insulated so as to maintain a suitable low temperature for the milk, and the insulation is employed also to cushion the load of the milk tank, which is supported by a saddle provided by the whey tank and fixedly anchored to the saddle.

Another object of the invention is the provision of an improved whey tank structure which is simple, which may be manufactured economically, which has a minimum number of parts, and which is of such strength and so reinforced that no other frame is needed, and the whey tank may be mounted directly on the truck frame.

Another object of the invention is the provision of an improved whey tank which has baffles reinforcing the tank and preventing the whey from sloshing back and forth so that the whey cannot be moved quickly from one end of the tank to the other, but the baffles are provided with suitable openings so that the whey can be moved from one compartment to another, permitting the entire tank to be filled from one or more inlets, which may also serve as outlets, and in which there are cleaning openings and liquid-tight covers so placed with respect to the baffles and compartments that the operator may reach in the openings with a hose, and all parts of the inside are accessible to water or other cleaning agents projected by the hose.

Other objects and advantages of the invention will be apparent from the following description and the accompanying drawings, in which similar characters of reference indicate similar parts throughout the several views.

Referring to the drawings, of which there are four sheets,

FIG. 1 is a view in perspective of a combined bulk milk and whey tank assembly embodying the invention;
FIG. 2 is a front elevational view;
FIG. 3 is a rear elevational view;
FIG. 4 is a side elevational view;
FIG. 5 is a fragmentary view in perspective taken from the front of the assembly;
FIG. 6 is a top plan view;
FIG. 7 is a side elevational view;
FIG. 8 is a front elevation, omitting the vent pipes;
FIG. 9 is a view in perspective of the whey tank and saddle;
FIG. 10 is a top plan view of the same;
FIG. 11 is a rear elevational view;
FIG. 12 is a side elevational view;
FIG. 13 is a fragmentary view in perspective of the whey tank and saddle;
FIG. 14 is a side elevational view of the combined bulk milk and whey tank assembly.

Referring to FIGS. 9–14, there are views showing the structure of the whey tank and the saddle for supporting the bulk milk tank. The whey tank is preferably constructed of sheet steel plates of suitable thickness, such as, for example, all the outer plates may be of $\frac{3}{16}$ inch.

Thus the whey tank comprises a bottom plate 10, a pair of side plates 11 and 12, a front end plate 13, a rear end plate 14, the saddle plate 15, and two top plates 16 and 17.

In some embodiments of the invention these may comprise separate plates, while in other forms of the invention certain plates may be integrally joined at the corners; but all of the foregoing plates are welded together at their junctures to form a tank which is generally rectangular in shape, but is provided with the cylindrical saddle 15 extending from end to end of the tank and adapted to fit and cushion the stainless steel insulated milk tank 18 (FIG. 2), which is supported and secured in the saddle 15.

The end plates 13 and 14 are each provided with a partially circular cut-out 19 for juncture with the end of the cylindrical saddle 15, which preferably overlaps the end plates 13, 14 at the circular cut-out 19, and is welded thereto along the line 20.

In a similar manner the side plates 11 and 12 may abut against the straight side edge 21 of end plates 13 and 14 and be welded thereto along the line 21; and the bottom plate 10 may abut against the straight bottom edge 22 of each end plate 13, 14 and may be welded thereto along the line 22.

The side plate 11 may abut against the straight edge 22 of end plates 13 and 14 and may be welded thereto along the line 23. The top plates 16 and 17 may abut against the upper straight edges 24 and 25 of the end plates 13 and 14 and may be welded thereto along the lines 24 and 25.

The top plates 16 ad 17 also abut against the straight top edge 26 of the side plates 11 and 12, to which they are welded along the line 26 in each case.

In order to increase the rigidity of the assembly all the junctures may be welded and provided with a fillet of weld material on the inside, as well as being welded on the outside, until the tank is closed by locating and welding the last plate, such as, for example, the saddle 15.

The saddle plate 15 is formed on such a radius into partially cylindrical form so that it will be complementary to the outside of the milk tank 18 when provided with a covering of cork to insulate the milk tank. The saddle plate 15 preferably extends over less than 180 degrees of circumference so that the milk tank can be loaded into the saddle from the top; and the saddle plate preferably projects above the top plates 16 and 17, as indicated at 27, on each side at the top of the saddle plate, where the plate is provided with an outwardly projecting securing flange 28, 29, extending horizontally and over the full length of the saddle from front to back.

The flanges 28, 29 are provided with a plurality of regularly spaced apertures 30 for receiving the screw bolts 31, which pass through these flanges and through a similar flange 32 on the tank cover 33 and are provided with nuts 34, drawing the tank cover 33 tightly on the milk tank and securing it in the saddle.

The flanges 28 and 29 may comprise integral outwardly turned flanges on the saddle; and the flanges 32 may be integral outwardly turned flanges on the cover 33, or they may consist of separate angles 35 and 36 welded or bolted to the cover 33 and saddle 15 and provided with apertures in their parallel flanges, as shown in FIG. 16.

The space between the flanges may in either case be covered by a third angle 37, having apertures for the bolts and having one flange depending to cover the crack and bolts.

The saddle 15 in any case projects above the top plates 17, which may abut against the saddle and be welded thereto along the lines 38 at each of the lateral edges of the top plates 16 and 17. Top plates 16 and 17 are preferably provided with a plurality of rectangular apertures located to give access to the space between baffles, further to be described, and covered with rectangular cover plates 39 having apertures for passing screw bolts 40, which are threaded into threaded bores in the top plates 16 and 17, with a gasket interposed between the covers and top plates in each case to provide a liquid-tight joint.

Referring to FIG. 6, this is a modification in which one of the covers 41 on each side is elongated over a rectangular aperture which gives access to the space in front of and behind a central baffle 42 in the whey tank.

The side plates 11 and 12 are provided with a circular cut-out 42 on each side of the whey tank for accommodating the truck wheels; and this cut-out may be closed by a partially circular plate 43 and by a segment plate 44, as the curved plates 42 do not extend all the way across the bottom of the whey tank, but extend only far enough to accommodate the wheels.

The bottom plate 10 may be extended backwardly with an integral portion 45, forming a shelf, having a suitable covering 46 and adapted to support a centrally located pump housing 47 (FIG. 7).

The shelf 45 may have a ladder step 48 of rectangular U shape welded to its rear edge, or this ladder may form a part of the chassis.

Referring to FIGS. 5-8, the whey tank is provided on its inside with a plurality of baffles 49, 42, 50 on each side of the tank; and the lower baffles 51, 52, 53 of the shape shown in FIG. 8, for dividing the whey tank into separate chambers 54, 55, 56, 57.

The baffles 49, 42, 50 are trapezoidal and are welded to the tank sides along their lateral edges 57 and their bottom edges 58; and the bottom edges are provided with half circular cut-outs 59, which also extend through the lower baffles 51—53 and provide communication between the chambers 54—57 so that the whey in the tank may run from one chamber to another.

The lower baffles 51—53 may also be welded to the bottom and side walls along the same lines and to the vertical baffles 49, 42, 50 for reinforcing the assembly and preventing the whey from sloshing back and forth under traffic conditions or from moving rapidly from one chamber to another when the truck is ascending or descending a hill.

The corner spaces between the baffles and the milk tank may be closed by curved portions or left open, as indicated at 60 (FIG. 5).

The end plate 14 may be provided with a pair of steps 61, 62 above the platform 45 on one side and the steps 61, 62 comprise acutely bent sheets of metal with their edges welded to the end plate 14 at 63 in each case.

The whey tank is preferably provided with a pair of air vents 64 at the forward end in the top plates 16 and 17, comprising short sections of threaded pipe welded in place; and the air vents 64 may be provided with upwardly extending curved pipes 65 (FIG. 2) rising above the top of the milk tank and terminating in downwardly extending hoses 66.

The whey tank is also provided with a pair of inlet pipes 67 preferably located in the end wall 13 at the lower outer corners, comprising threaded pipes welded in place and provided with suitable valves and hose connections for draining off the whey when it is to be dispensed and for pumping in the whey when the tank is to be filled.

The milk tank 18 preferably comprises a stainless steel cylindrical tank having its cylindrical wall 68 (FIG. 5) of such size that when it is covered with a cylinder of cork 69 the milk tank fits in the saddle 15.

Stainless steel tank 18 is closed by a convex end wall 70, 71 at each end; and it is provided with a top opening closed by a suitable cover and dome 72 with liquid-tight gaskets and securing devices (not shown).

The cork covering 69 extends over the complete outer area of the tank 18; and the dome 72 is also insulated for maintaining the milk at a suitable temperature, such as about 40 degrees F., the milk having been cooled, before being placed in the tank, to such a temperature that it will be kept cool by the insulation until it is delivered from the tank.

A curved metal ladder 73 preferably extends from the base 74 of the dome to the top plate 16 of the whey tank; and the ladder is welded in place at both ends.

The milk tank and its cork covering are covered by a sheet metal cover 33 of partially cylindrical shape, having such a tight fit that it may be pulled down around the top of the milk tank by means of the bolts 31, anchoring the milk tank in place and protecting the cork insulation.

The partially cylindrical milk tank cover 33 extends from the front end to the rear end and is joined at 75 to a rear pump housing cover 76 which overlaps the cover 33 and the pump housing 47, to which the cover 76 is bolted.

The cover 76 may be partially spherical, as shown in FIG. 1, or it may be formed with a pair of rear corners 77 and closed by a rear plate 78.

The pump housing 47 comprises a rectangular box welded or bolted in place and provided with a pair of rear doors 79 hinged laterally at 80 and adapted to enclose a suitable pump, hose, hose connections, and tools.

The front end of the stainless steel milk tank may be closed by a circular concave end plate 81 welded to the cover 33 and protecting the cork covering at the ends of the tank.

When constructed as described, the present whey tank is adapted to provide a firm and protective seat or saddle for receiving the milk tank; and the assembly is of such strength that it does not require any additional reinforcing; and it can be mounted directly on the truck frame or chassis.

It will thus be observed that I have invented an improved bulk milk tank and whey tank assembly by means of which the load is maintained in a distributed condition from front to back over all of the wheels of the truck; and the whey is prevented from sloshing back and forth or transferring so quickly from one chamber to the other so that the equilibrium of the load is not disturbed by any traffic conditions.

The driver may start out with a truck having the whey tank filled with whey to be delivered to the farmers and, with the milk tank empty, to receive bulk milk, which is purchased from the farmers; and thus the present assembly performs the dual function of providing for the dispensing of whey and the gathering of the bulk milk.

While I have illustrated a perferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. A combined whey tank and milk tank comprising a whey tank serving as a supporting saddle for an insulated milk tank, comprising a bottom plate of rectangular shape for mounting upon a vehicle chassis, said bottom plate having a pair of side walls and a pair of end walls attached thereto and to each other, forming a box-like tank, each end wall having a semi-circular cut-out in its upper portion spaced from the bottom plate and from the side walls, an elongated, narrow rectangular top plate extending from end plate to end plate in each case and from side plate to said cut-out in each case and joined to the side plates and end plates and a semi-cylindrical inner wall plate, fitting the semi-circular cut-outs in the end plates and secured to the end plates and the narrow top plates and extending above the narrow top plates and having an outwardly extending top attaching flange on said semi-cylindrical inner wall, forming a saddle for supporting a cylindrical milk tank, said narrow top walls each being provided with a plurality of upper rectangular cleaning openings, closed by bolted covers and gaskets, one of said end walls being provided with a pair of hose conduits located near the lower outer corners of the said end walls for attachment of hose, and a cylindrical milk tank covered over all with heat insulation and with an upper half cylindrical metal shield having a lateral horizontal attaching flange along each of the two bottom edges of said shield, the said milk tank and insulation fitting in the supporting saddle of said whey tank, and the milk tank and insulation being secured therein by through bolts passing through the attaching flanges of the shield and saddle.

2. A combined whey tank and milk tank comprising a whey tank serving as a supporting saddle for an insulated milk tank, comprising a bottom plate of rectangular shape for mounting upon a vehicle chassis, said bottom plate having a pair of side walls and a pair of end walls attached thereto and to each other, forming a box-like tank, each end wall having a semi-circular cut-out in its upper portion spaced from the bottom plate and from the side walls, an elongated, narrow rectangular top plate extending from end plate to end plate in each case and from side plate to said cut-out in each case and joined to the side plates and end plates and a semi-cylindrical inner wall plate, fitting the semi-circular cut-outs in the end plates and secured to the end plates and the narrow top plates and extending above the narrow top plates and having an outwardly extending top attaching flange on said semi-cylindrical inner wall, forming a saddle for supporting a cylindrical milk tank, said narrow top walls each being provided with a plurality of upper rectangular cleaning openings, closed by bolted covers and gaskets, one of said end walls being provided with a pair of hose conduits located near the lower outer corners of the said end walls for attachment of hose, and a cylindrical milk tank covered over all with heat insulation and with an upper half cylindrical metal shield having a lateral horizontal attaching flange along each of the two bottom edges of said shield, the said milk tank and insulation fitting in the supporting saddle of said whey tank, and the milk tank and insulation being secured therein by through bolts passing through the attaching flanges of the shield and saddle, and a plurality of inner partitions of sheet metal of trapezoidal shape in the whey tank and extending from and secured to the bottom, the side wall, and the narrow top wall in each case and located between the top openings and joined and braced across the bottom plate by a transverse narrow partition between each pair of trapezoidal partitions, and secured to them and to the bottom plate and to the side plates in each case, making chambers in the whey tank communicating with each other, but preventing sloshing or quick movement of the entire load of whey from one space to another past the partitions.

3. A combined whey tank and milk tank comprising a whey tank serving as a supporting saddle for an insulated milk tank, comprising a bottom plate of rectangular shape for mounting upon a vehicle chassis, said bottom plate having a pair of side walls and a pair of end walls attached thereto and attached to each other at the corners forming a box-like whey tank, each end wall having a curved cut-out in its upper portion, spaced from the bottom plate and from the side walls, an elongated narrow rectangular top plate extending from end plate to end plate in each case, and from side plate to said cut-out in each case and joined to the side plates and end plates, and a curved inner wall plate, fitting in the curved cut-outs in the end plates and secured to the end plates and to the narrow top plates and extending above the narrow top plates and having outwardly extending top attaching flanges on said curved inner wall, forming a saddle for supporting the bottom of a complementarily curved milk tank, and a curved milk tank having its bottom fitting in said saddle and covered overall with heat insulation and with an upper complementarily curved metal cover shield having a laterally projecting horizontal attaching flange along each of the two bottom edges of said shield spaced from but close to the laterally extending attaching flanges on said curved inner wall of said saddle, the said milk tank and insulation fitting inside said saddle and cover shield and the milk tank and insulation being secured therein by through bolts passing through the attaching flanges of the shield and saddle.

4. A combined whey tank and milk tank according to claim 3 having a plurality of inner partitions of sheet metal inside the whey tank and spaced from each other longitudinally of the whey tank and extending from and secured to the bottom and side walls and having communicating openings in the partitions permitting the whey to flow through the partitions but providing chambers in the whey tank communicating with each other but preventing sloshing or quick movement of the entire load of whey from one chamber to another past the partitions.

References Cited in the file of this patent

UNITED STATES PATENTS

| | | |
|---|---|---|
| 1,400,345 | Brile | Dec. 13, 1921 |
| 2,037,024 | Holby | Apr. 14, 1936 |
| 2,135,573 | Gill | Nov. 8, 1938 |
| 2,160,477 | Kramer | May 30, 1939 |
| 2,229,793 | Bradley | Jan. 28, 1941 |
| 2,369,890 | George | Feb. 20, 1947 |
| 2,927,711 | Naggiar | Mar. 8, 1960 |